Dec. 3, 1940.  C. WHITE ET AL  2,223,651
SLUSH-PUMP VALVE
Filed Aug. 1, 1940
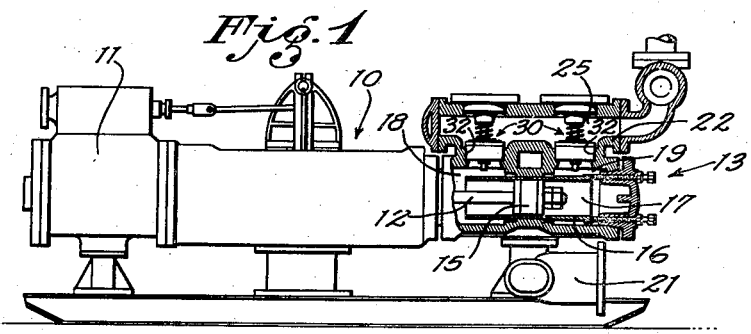
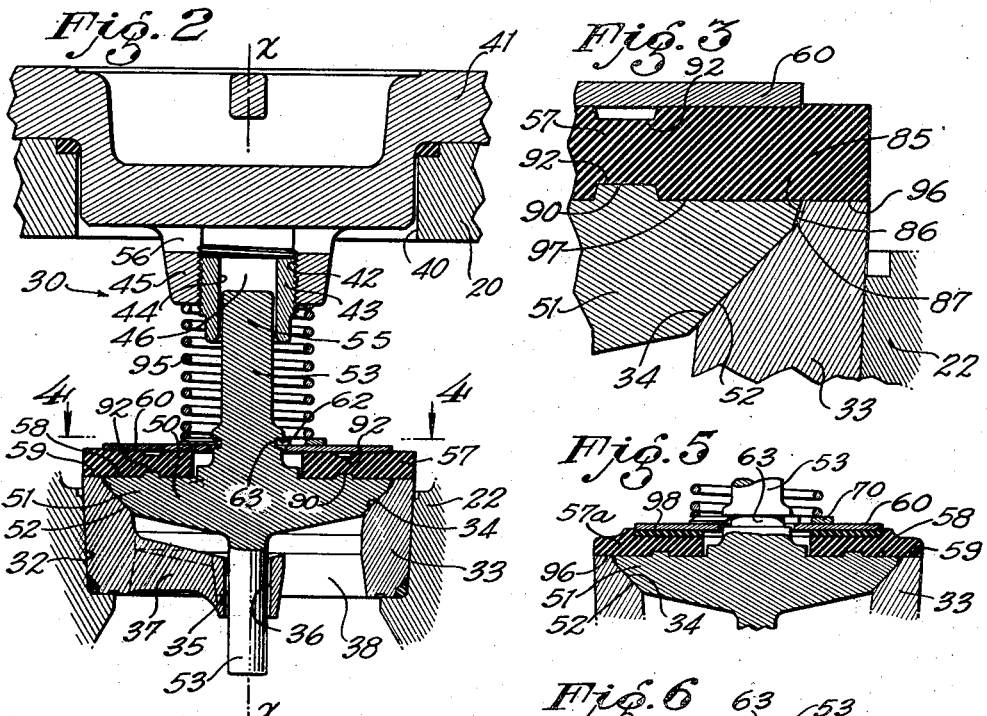
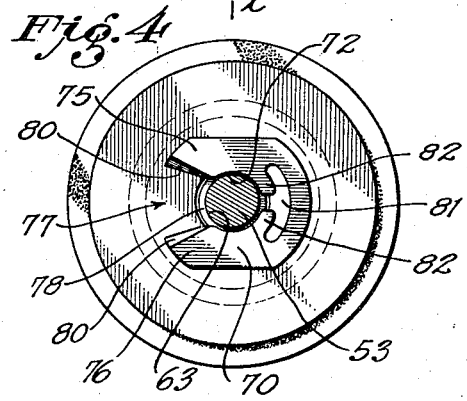
INVENTORS
CLARENCE WHITE
OLIVER B. GRAHAM
BY
HARRIS, KIECH, FOSTER & HARRIS
FOR THE FIRM
ATTORNEYS.

Patented Dec. 3, 1940

2,223,651

UNITED STATES PATENT OFFICE 2,223,651

SLUSH-PUMP VALVE

Clarence White, Walnut Park, and Oliver B. Graham, Los Angeles, Calif., assignors to Oil Well Manufacturing Corporation, Los Angeles, Calif., a corporation of California Application August 1, 1940, Serial No. 349,140

4 Claims. (Cl. 251—144)

This invention relates to check valves, and more particularly to a novel form of check valve suitable for use in a slush-pump valve structure.

In drilling oil wells by the rotary method, it is customary to continuously supply rotary mud under pressure to the rotating bit through the drill pipe. A slush pump is utilized for developing this high pressure. The intake and outlet valves of the slush pump are of the check valve type and ordinarily comprise a stationary seat with a pressure-operated valve member adapted to seat thereon to form a fluid tight fit when the pressure on one side of the valve becomes greater than on the other side thereof by a predetermined amount.

The mud used in ordinary drilling operations contains large quantities of abrasive matter, which quickly wears away the valve and the valve seat.

A flexible rubber valve, because of its ability to conform to a rough seat would be the most satisfactory form of valve for slush pumps if it were not for the high pressure to which such a valve is subjected. An all-metal valve, while capable of sustaining these high pressures, wears rapidly under the abrasive action of the pumping fluids.

Valve structures combining metal and rubber parts to secure both the flexibility and resistance to high pressure have been devised for use in slush pumps. Such a valve structure is shown in Patent No. 2,103,503 issued December 28, 1937, to one of the instant inventors. The invention herein described is an improvement upon the valve structure described in the specification and shown in the drawing of that patent.

It is one object of this invention to provide a flexible sealing disc for use in a valve structure of the type shown and described in the above numbered patent which shall have both the quality to resist the wear of the abrasive material and the mud fluid and the characteristic of resilient compressibility. Its compressibility enables the dish to be readily secured by a fastening clip, and its flexibility along radial lines insures an effective sealing contact with the annular surface of the valve seat which it engages.

Claims to this flexible sealing disc are not made in this application which will disclose this feature of the invention in an improved form.

It is another object of this invention to provide a valve construction of the type of the above numbered patent in which the valve and valve seat are so shaped in cross-sectional contour as to provide an effective sealing engagement between them when the valve is seated and at the same time present surfaces to the moving fluid so related to each other and to the direction of flow of the fluid as to reduce to a minimum abrasive wear and deformation of the valve, valve seat and sealing disc and to prolong the life of the parts of the valve structure.

These and other objects of this invention will be understood from the following description and claims in connection with the accompanying drawing, which presents the particular embodiments of the invention for illustrative purposes only.

In the drawing:

Fig. 1 is a utility view illustrating a slush pump equipped with check valves embodying the features of my invention.

Fig. 2 is a sectional view of one of the check valves, showing the valve in closed position.

Fig. 3 is an enlarged fragmentary-sectional view of portions of the sealing disc, valve, and valve seat.

Fig. 4 is a sectional view taken as indicated by the line 4—4 of Fig. 2.

Fig. 5 is a fragmentary cross-sectional view similar to Fig. 2 showing another form of this invention.

Fig. 6 is a fragmentary sectional view similar to Fig. 2 of still another modified form of this invention.

Fig. 1 illustrates a slush pump generally designated by the numeral 10 having a prime mover 11 operatively connected by a connecting rod 12 to a pump section 13. The prime mover reciprocates the rod 12 which carries with it a piston 15 slidable in a liner 16. This liner provides a cylinder 17 which is open at both ends, so as to communicate both with the valve outlet passages 18 and 19 respectively and through two check valves (not shown) with the intake pipe 21.

Two outlet or discharge valves 30 are disposed in two upwardly diverging tapered passages 32 formed in a valve deck 22. The passages 32 connect the passages 18 and 19 with a discharge passage 25. The two valve structures 30 and the check valve structures (not shown) between the intake passage 21 and the two ends of the cylinder 17 are identical in structure, and are illustrated in Figs. 2 to 4 inclusive.

When the piston 15 is moved to the left the right-hand intake check valve (not shown) is opened by the pressure differential which exists between the intake passage 21 and the cylinder 17 and the valve of the right-hand valve structure 30 is held closed by the pressure differential which exists between the discharge passage 25 and the outlet valve passage 19. At the same time, the leftward intake valve (not shown) is held closed and the leftward check valve 30 is opened. Mud fluid flows into the right-hand end of the cylinder 17 and is forced from the left-hand end of the cylinder through the valve outlet passage 18, liquid valve 30, and discharge passage 25.

When the direction of movement of the connecting rod 12 is reversed mud fluid flows from the inlet pipe 21 to the leftward chamber of the cylinder 17 and from the rightward chamber of the cylinder 17 through the rightward valve structure 30 to the discharge passage 25.

As is shown in Fig. 2, the valve deck 22 is provided with an upwardly diverging tapered passage 32 adapted to receive a tapered metal valve seat 33, preferably in press-fit relationship therewith. The valve seat 33 is provided with an upwardly facing, conical, centrally extending, lower seating surface 34 and a central hub 35 providing an axial bore 36. The hub 35 is integrally connected to the body portion of the seat member 33 by a web 37 substantially in the manner shown, so as to provide a fluid passage 38 through the seat member.

Provided in a valve housing 20, directly above the valve structure 30, is an opening 40 of sufficient diameter to allow the passage of the valve structure 30 therethrough. The opening 40 is closed by a suitable cap 41 having a centrally disposed depending cylindrical boss 45 formed with a central cylindrical recess 42, which is interiorly threaded to receive a threaded bushing 43. This bushing has a central bore 44 which extends coaxially with the bore 36 in the hub 35. A valve 50 has a disc shaped body 51 formed on its peripheral edge with a downwardly facing conical seat 52 conforming to the shape of the seating surface 34 of the seat 33. This body is designed to carry the pressure load on the valve. The valve body 51 has a preferably integral pin portion 53 which projects axially both above and below the valve disc or body 51. The upper projection of the pin constitutes a valve stem 55. These projections are of such diameters as to be slidably received in the bores 44 and 36 respectively for the purpose of guiding the valve body 51 in its vertical reciprocatory movements out of contact and into contact with the valve seat 33. The boss 45 is formed with a plurality of radially disposed passages 56 therethrough adjacent the body of the cap 41 to permit free movement of mud fluid into and out of a bore chamber 46 of the bushing 43 and thereby provide for a free sliding movement of the pin 53 within the bore 44.

Carried by the body portion 51 is a centrally apertured disc or annulus 57 formed of hard rubber or other suitable material having both limited flexibility and sufficient hardness to resist abrasion. The disc 57 is preferably in the form of an annular ring which surrounds the stem 55 and rests upon an upper surface 58 of the valve body 51. This disc is of larger diameter than the body 51 so as to extend outwardly beyond the periphery thereof and preferably as far as the outer edge of an upper annular horizontal seating face 59 of the valve seat 33.

Disposed on top of the disc 57 is a centrally apertured pressure plate 60. Formed in the stem 55 and adjacent the pressure plate 60 is a shoulder 62 which forms the upper horizontal annular face of an annular groove 63 formed in the stem 55. The shoulder 62 serves as an abutment for a resilient clip 70 adapted to retain in assembled relationship the pressure plate 60, disc 57 and valve body 51.

The clip 70 is in the form of a plate having a central opening 72 sized to closely fit within the annular groove 63 in the stem 55. The clip is provided with a pair of fingers 75 and 76 cooperating to form a passage 77 extending through one side of the plate to the central opening 72. As illustrated in Fig. 4, the width of a constricted portion 78 of this passage is slightly less than the diameter of the central opening 72. The outer portions of the fingers 75 and 76 are preferably tapered outwardly and beveled upwardly. Formed in the clip 70 on the opposite side from the passage 77 is a cut out portion 81 communicating with the opening 72 in such a manner that the walls formed by the opening 72 provide a pair of arcuate segments 82 spaced as shown from the integral resilient portion adjoining the fingers 75 and 76.

With the disc 57 and the pressure plate 60 assembled on the valve body 51 as shown and previously described, the clip 70 is positioned on the pressure plate 60 so that the tapered surfaces 80 of the fingers 75 and 76 engage the lower surface of the shoulder 62. The clip 70 is then driven or otherwise forced laterally so that the fingers 75 and 76 snap around the stem 55 into the position shown in Fig. 5, which serves to confine the flexible disc 57 between the clip 70 and the body 51. It is obvious that for the removal of the disc 57 from the valve body, it is only necessary to force the clip 70 in the opposite direction to that above described whereupon the pressure plate 60 and the disc 57 may be removed from the valve for replacement or for the purpose of reversing the valve disc 57.

By means of an upwardly extending annular rib 90 formed on the upper surface 58 of the valve body 51, and mating annular grooves 92 formed on opposite faces of the disc 57, the disc may be centralized with relation to the valves irrespective of that one of its two sides which is placed downwardly.

Confined between the pressure plate 60 and the lower end of the boss 45 is a compression spring 95 adapted to constantly urge the valve body into engagement with the seat 33 against the pressure differential of the mud fluid in the fluid chambers on the two sides of the valve structure.

In the operation of the valve, the valve body 51 carries the pressure load of the mud fluid above the valve and transmits it through the seating surfaces 52 and 34 to the valve seat 33, and a radially outermost annular portion 96 of the lower surface 97 of the insert disc 57 engages the annular face 59 of the seat 33 forming an annular seal by reason of the relatively compressible character of the insert disc 57.

The conical surfaces 34 and 52 do not extend all the way to the surfaces 58 and 59, but terminate a relatively short distance therefrom. The surface 52 is connected to the surface 58 by a conical surface 86, which forms with the axis line $x$—$x$ of the valve structure (see Fig. 2) a smaller angle than that formed by the surface 52. The valve seat 33 is formed with a corresponding conical surface 85 inclined to the axis of the valve structure at the same angle as the surface 86 and conforming to that surface.

The valve body 51 and the valve seat 33 may be machined so that the surfaces 85 and 86 have a seating contact in the same manner as the surfaces 34 and 52, or surfaces 85 and 86 may be spaced a relatively small distance apart to present a conical void 87. The surfaces 85 and 86 need not necessarily be conical, but may be curvilinear or of other design. It is essential to the principle of the invention, however, that the circle of intersection of these surfaces with the surfaces 58 and 59 be greater than the circle of their intersection with the surfaces 34 and 52, and less than the circle of intersection of the projection of the surfaces 34 and 52 with the surfaces 58 and 59.

These surfaces 85 and 86 present seating and sealing contact auxiliary to that of the surfaces 34 and 52. This novel design possesses several advantages. If the surfaces 34 and 52 were extended to the surfaces 58 and 59, the valve body 51 would have formed at the junction of the surfaces 52 and 58 an annular feather edge which would curl upwardly under the heavy pressure of the mud fluid flowing upwardly between the surfaces 34 and 52 as the valve is dropping toward the seat. This feather edge would cut into the rubber material of the valve insert disc 57. If to obviate this disadvantage the upper end of the surface 52 were made cylindrical for a short distance, a void would be presented between this cylindrical surface and the upper portion of the surface 34 into which the material of the disc insert 57 would protrude as the valve structure is used, forming a ring of disintegrated spongelike rubber extending both into the void and above the void. This ring would eventually wear away, leaving an annular arcuate groove extending upwardly into the disc insert 57 opposite the void. Such a groove weakens the disc insert 57.

If on the other hand the upper portions of surfaces 34 and 52 are both made cylindrical in contacting conformance to avoid a void and to prevent the formation of a feather edge on the valve body 51, the lower annular edge of the cylindrical surface on the valve body 51 will strike, chip, and wear away the upper annular edge of the cylindrical surface on the valve seat 33 due to the radial play of the pin 53 in the bushing 43 and hub 35.

The surfaces 85 and 86 avoid all of these difficulties. The feather edge on the valve body 51 is eliminated. The conical character of the surfaces 85 and 86 takes care of the radial play of the valve body with respect to the seat 33. The formation of a sponge rubber ring on the insert disc 57 is entirely eliminated, if the surfaces 85 and 86 are in contactual seating relationship. If they are separated by a slight gap as shown in Fig. 3, this gap is soon reduced to zero by wear of the surfaces 34 and 52 and is in any event too small to cause deterioration in the juxtaposed portion of the under-surface 97 of the valve insert 57. In addition, these two surfaces 85 and 86, being at an angle to the surfaces 34 and 52, check the flow of mud fluid and increase the sealing effect over that which would exist if the surfaces 34 and 52 were extended all the way to the surfaces 58 and 59.

The insert disc 57 is made of non-metallic material of slightly compressible character which is, however, sufficiently hard to resist the blows to which it is subjected and the abrasive action of the mud fluid. It is preferably made of hard rubber, although it may be made of Bakelite or other non-metallic and plastic material.

While the disc 57 is more compressible than metal and has effective sealing contact with the surface 59 of the valve seat, its incompressibility makes it difficult to insert the clip 70 thereabove.

In Fig. 5 is shown a rubber ring or annulus 98, preferably of the same diameter as the superimposed pressure plate 60, which is inlaid either loosely or adhesively in the upper face of an insert disc 57a. This rubber ring 98 is of softer material than the insert disc 57a and by reason of its greater compressibility, facilitates the assembling of the several parts of the valve and the driving into place of the clip 70.

The ring 98 accomplishes another purpose. It softens the blow of the outer annular portion of the insert disc 57a on the valve seat 33, and of the valve body 51 on the surface 34 of the valve seat 33, lengthening the interval of time from the initial contact up to the instant at which the full pressure is developed between the contacting surfaces. Furthermore, as the surfaces 34 and 52 and surfaces 85 and 86 become worn in use, the upper surface 58 of the valve body 51 drops somewhat below the upper surface 59 of the valve seat 33. The rubber ring 98, after such wear has developed, prevents the development of full pressure between surfaces 59 and 96 at the time these two surfaces first contact as the valve is falling, absorbs much of the energy of the blow as it is being compressed, delivers up this energy slowly to the falling valve structure, most of the energy being finally delivered by the valve body 51 to the seat 33 through the contact of surfaces 34 and 52, thereby sparing the outer annular surface 96 of the valve insert 57a.

The rubber ring 98 need not necessarily be inlaid in the upper surface of the valve insert 57, as shown in Fig. 5, but may, as shown in Fig. 6, be incorporated as a soft rubber ring 98a between an upper and lower layer of the valve insert 57b. The soft rubber ring may be inlaid in the undersurface of the valve insert 57, or in both the upper and under surfaces thereof. A ring or lamina of soft rubber in any of these dispositions facilitates the insertion of the clip 70, and lessens the blow of the valve insert upon the outer annular surface 59 of the valve seat, both when the valve structure is new and after a period of use. Furthermore, the reduction of the vertical cross-sectional area of hard rubber in the valve insert at annular zones other than the extreme outer annular portion of the valve insert allows a downward flexure of the inner portion of the valve insert as the valve structure becomes worn, insuring a tight seal between the surfaces 59 and 96 and insuring the reception of the greater part of the impact of the valve on the valve seat at the surfaces 34 and 52, rather than between the surfaces 59 and 96.

The term "in juxtaposition" as used herein to describe the relative position of two faces of the valve parts defines the two faces as directed toward each other and includes both a position of actual contact and a position of relatively slight separation of the two faces.

Although there have been herein described certain embodiments of this invention, it is understood that various changes may be made and the invention may be embodied in other structures without departing from the scope of the invention, which is defined in the appended claims.

We claim as our invention:

1. In a valve structure, the combination of: a valve seat having an annular face perpendicular to the axis of said structure, a first conical face flaring inwardly away from said annular face and a second inwardly flaring conical face connecting said annular face and said first conical face and forming a smaller angle with said axis than the first conical face; a valve body having a first conical face parallel to and in juxtaposition with said first conical face of said valve seat, a second conical face parallel to and in juxtaposition with said second conical face on said valve seat, and an annular face parallel to and substantially in the same plane as said annular face of said valve seat; and a sealing disc having an annular face contactually engaging said annular faces of both said valve seat and valve body respectively.

2. In a valve structure, the combination of: a valve seat having an annular face perpendicular to the axis of said structure, a first conical face flaring inwardly away from said annular face and a second inwardly flaring conical face connecting said annular face and said first conical face and forming a smaller angle with said axis than said first conical face; a valve body having a first conical face conforming to and contacting said first conical face of said valve seat, a second conical face conforming to and spaced a relatively small distance from said second conical face on said valve seat, and an annular face parallel to and substantially in the same plane as said annular face of said valve seat; and a sealing disc having an annular face contactually engaging said annular faces of both said valve seat and valve body respectively.

3. In a valve structure, the combination of: a valve seat having an annular face perpendicular to the axis of said structure, a first conical face flaring inwardly away from said annular face, and a second inwardly flaring conical face connecting said annular face and said first conical face and forming a smaller angle with said axis than the first conical face; a valve body having a conical face parallel to and contacting said first conical face of said valve seat, an annular face parallel to and substantially in the same plane as said annular face of said valve seat, and a face connecting said last-mentioned annular face of said valve body and said first conical face of said valve body and disposed opposite said second conical face of said valve seat; and a sealing disc having an annular face contactually engaging both said annular face of said valve seat and said first mentioned annular face of said valve body.

4. In a valve structure, the combination of: a valve seat having an annular face perpendicular to the axis of said structure, a conical valve seat face tapering inwardly away from said annular face, and a face connecting said annular and valve seat faces and intersecting said annular face in a circle greater than the circle of intersection of said connecting face and said valve seat face and smaller than the circle of intersection of the projection of said valve seat face with said annular face; a valve body having a conical face conforming to said valve seat face, an annular face parallel to and substantially in the same plane as said annular face of said valve seat, and a face connecting said conical face and annular face and conforming to said connecting face of said valve seat; and a sealing disc having an annular face contactually engaging said annular faces of both said valve seat and valve body respectively.

CLARENCE WHITE.
OLIVER B. GRAHAM.